A. Z. MYRUP.
CAMERA.
APPLICATION FILED APR. 23, 1917.
1,299,992.
Patented Apr. 8, 1919.
2 SHEETS—SHEET 1.
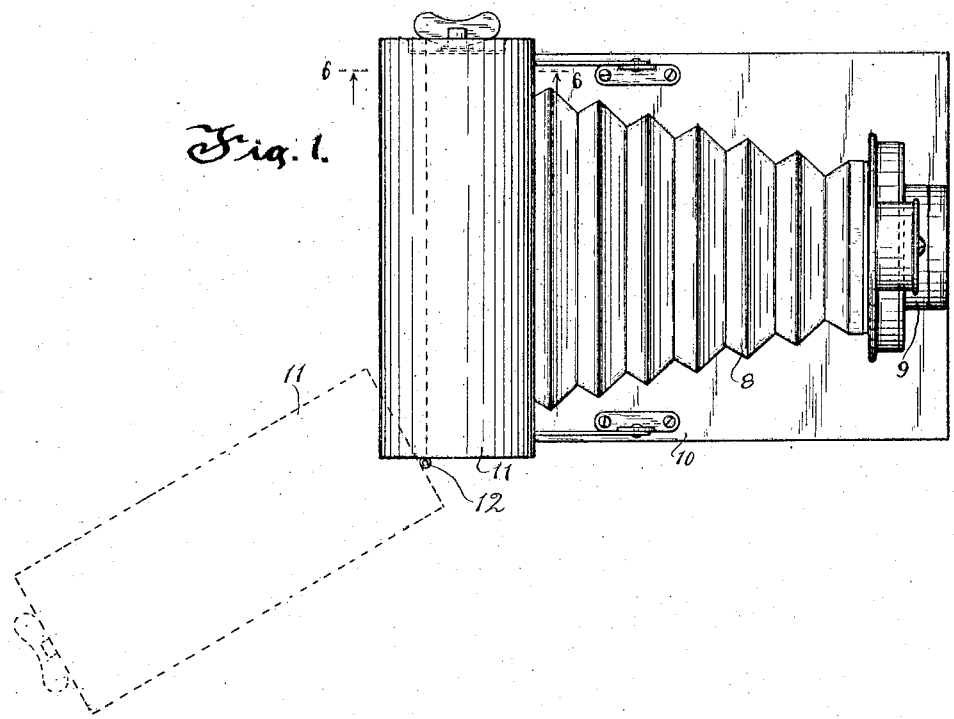
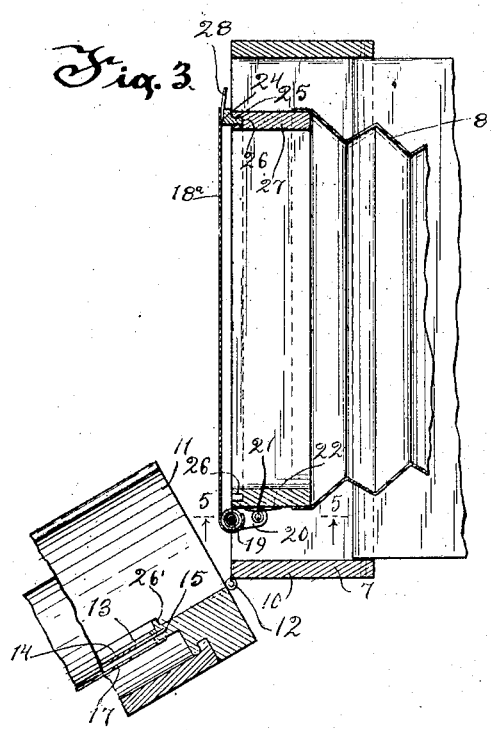
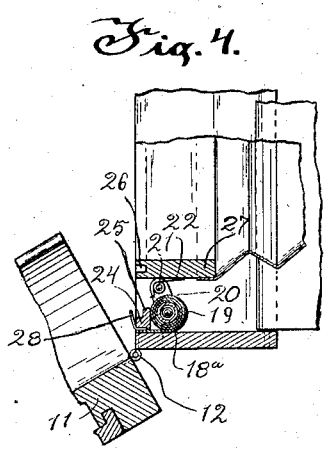
INVENTOR
Alfred Z. Myrup
By Morsell, Keeney and French
ATTORNEYS A. Z. MYRUP.
CAMERA.
APPLICATION FILED APR. 23, 1917.
1,299,992.
Patented Apr. 8, 1919.
2 SHEETS—SHEET 2.
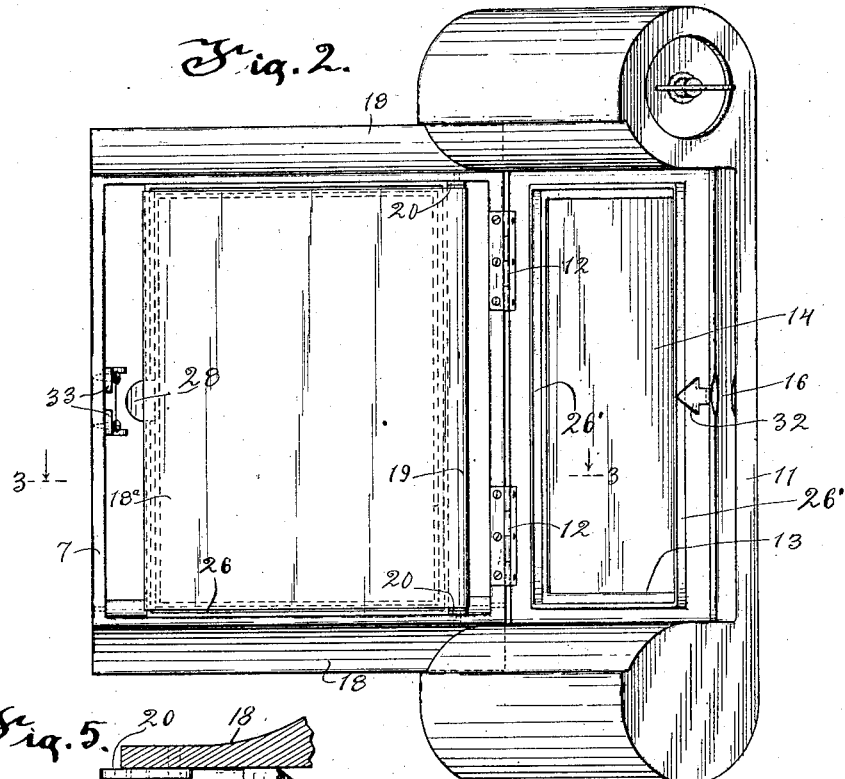
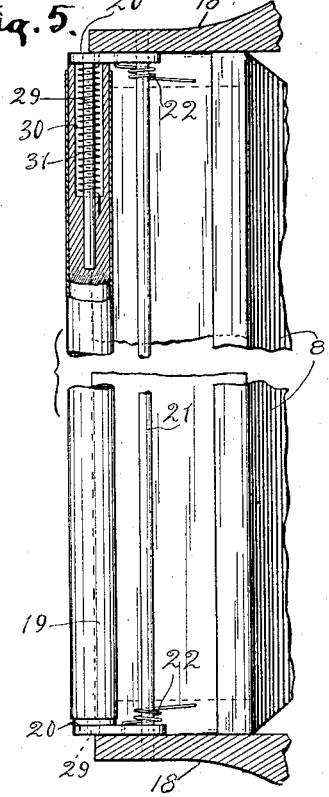
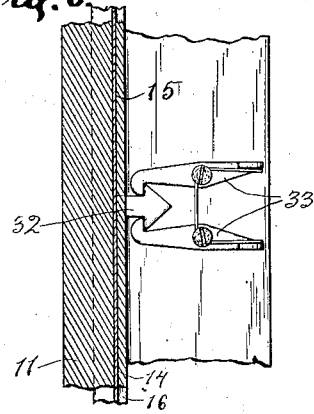
INVENTOR
Alfred Z. Myrup
By Morsell, Keeney and French
ATTORNEYS

UNITED STATES PATENT OFFICE.

ALFRED Z. MYRUP, OF RACINE, WISCONSIN.

CAMERA.

1,299,992.  Specification of Letters Patent.  Patented Apr. 8, 1919.

Application filed April 23, 1917. Serial No. 163,944.

*To all whom it may concern:*

Be it known that I, ALFRED Z. MYRUP, a citizen of the United States, and resident of Racine, in the county of Racine and State of Wisconsin, have invented new and useful Improvements in Cameras, of which the following is a description, reference being had to the accompanying drawings, which are a part of this specification.

This invention relates to improvements in cameras, and more particularly to the focusing means in a roll film type of camera.

In the ordinary cameras no provision is made for focusing the object to be photographed, except by an attempt to gage the distance of the camera from the object to be photographed, which, as is well known, is very difficult as well as entirely unreliable.

My invention contemplates as one of its main objects a means whereby it is possible to focus the object being photographed directly upon a focusing screen mounted within the camera in such position as to permit its use when desired, and thus the uncertainty which has heretofore existed in properly focusing the camera is overcome.

The invention further contemplates as an object a construction whereby a finder may be eliminated, if desired.

A further object is to so arrange the parts that in focusing, the focusing screen will occupy exactly the same plane or position during the focusing operation as is occupied by the film during exposure and after the focusing operation is completed, the camera being constructed to adjust the film back to the position previously occupied by it.

A further object of the invention is to provide means for so connecting the film holding portion of the camera to the camera box as to enable the film carrying section to be swung to position to permit of the viewing of the object to be photographed through the lens of the camera, said construction also providing for protecting the film from light while the film section is in open position.

With the above primary, and other incidental, objects in view, the invention consists of the devices and parts, or the equivalents thereof, as hereinafter more fully pointed out.

In the accompanying drawings:

Figure 1 is a plan view of the camera, also showing in dotted lines the back or film carrying section of the camera thrown to an open position;

Fig. 2 is a perspective view showing the box and the film carrying section opened away from each other;

Fig. 3 is a horizontal section on the line 3—3 of Fig. 2, looking in the direction of the arrows, showing the screen in its unwound operative position;

Fig. 4 is a similar view to Fig. 3, of the lower portion of Fig. 3, but showing the screen wound up upon a roll in its non-operative position;

Fig. 5 is a horizontal section on the line 5—5 of Fig. 3, looking upwardly in the direction of the arrows; and Fig. 6 is a horizontal section on the line 6—6 of Fig. 1, looking upwardly in the direction of the arrows.

Referring to the drawings, numeral 7 indicates the box or casing in which is contained the bellows 8, which carries at its outer or forward end the usual lens carrying frame 9. A door 10 hinged at its lower edge is adapted to close the outer side of this box, when the bellows is collapsed and pushed inwardly.

The film carrying casing is indicated by the numeral 11. This casing is hinged along one of its vertical edges to the corresponding vertical edge of the box, the hinged connections being indicated by numerals 12—12. The inner or front side of the film carrying casing is provided with an opening 13, preferably of rectangular form, which opening may be closed, when necessary, by means of a sliding shutter 14, which is adapted to slide in and out in grooveways similar to 15 (see Fig. 3). The slidable shutter is provided with a small niche or recess 16 to form a convenient grasp for pulling the shutter outwardly.

The upper and lower ends of the film carrying casing are circular in form in order to accommodate the upper and lower rolls (not shown) upon which the film 17 is wound. This film is carried downwardly from the upper roll into the space of the film carrying casing. The location of the grooveways 15 for the shutter is such that when said shutter is pushed inwardly to closing position a space is left between the shutter and the film located just back of the same. The upper and lower edges of the lens carrying box 7 are concaved, as indicated by the numerals 18—18 (see Fig. 2), in order to form recesses to receive the circular upper and lower ends of the film carrying casing 11.

The focusing curtain is indicated by the numeral 18ª. This curtain is made of any desirable translucent material, and I have found that ordinary tracing cloth is a desirable material. The lower end of this curtain is secured to a spring retrieved roller 19 which is rotatably mounted in the lower free ends of the arms 20—20, which arms are pivotally mounted upon a transverse pivot rod 21. Springs 22—22 are coiled around the pivot rod, and have their ends bearing upon the pivoted arms 20, said springs normally exerting pressure in a direction to cause the arms 20 to be swung back to the position shown in Fig. 4 of the drawing. When it is desired to adjust the curtain to a focusing position, the end thereof is grasped and the curtain pulled upwardly to the position shown in Fig. 3. The curtain is provided with an end cross piece 24, which cross piece is formed with a lug 25 which is adapted to enter one portion of a rectangular recess 26 formed in the rectangular frame 27 to which the bellows 8 are connected. The engagement of this lug with the recess 26 serves to lock the curtain in its unrolled focusing position. For convenience in grasping the curtain, its end is advisably provided with a finger piece 28.

As previously stated, the curtain roll 19 is spring-retrieved. It will be understood that the opposite ends of the roll are provided with pintles which engage the pivoted arms 20. At one end the roll 19 is provided with an inwardly extending socket 30 through which socket the pintle 29 at that end of the roll extends. This particular pintle is surrounded by a coiled spring 31. The action of this spring is such that when the locking lug 25 is released from the recess 26, the recoil of the spring 31 will cause a rotation of the roll 19 in the direction to compel the winding up of the focusing curtain upon the roll, and also when this locking lug 25 is released from the recess 25, the action of the spring 22 on the arms 20 will cause said arms to be swung back from the position shown in Fig. 3, to the position shown in Fig. 4.

Some desirable means should be provided for releasably locking the two sections of the camera together. I have shown in the drawings a convenient means which consists of an arrow-pointed lug 32 projecting forwardly from the frame which surround the opening 13, said arrow-pointed lug adapted, when the two sections are brought together in closing position to be automatically engaged by two medially pivoted spring actuated locking dogs 33—33. When it is desired to unlock the two sections, all that is necessary to be done is to grasp the outer handle portions of the dogs 33 and press said handle portions toward each other. This will necessarily disengage the inner locking ends of the dogs from the lug 32, and thus permit the swinging of the two sections of the camera to open position. In order to form a light proof joint between the film carrying casing and the camera box said casing is provided with a rectangular tongue 26' which enters the rectangular groove 26 of the box.

The foregoing constitutes a description of the principal mechanical features of the invention. The operation and advantages of this improved type of camera will now be explained.

In operation, it will be assumed that the shutter is in closed position in front of the film, as shown in Fig. 2. The camera is then opened as also shown in Fig. 2. The focusing curtain is unrolled from the roller 19 and is carried up to the position shown in Fig. 3, and temporarily locked in said position through the means heretofore described. While the camera remains open the next step is to focus the object upon the screen. When the proper focus has been obtained, the curtain is released, and through the mechanism heretofore described the said curtain automatically winds up on its roll. The film section of the camera is then swung to a closed position, and the shutter is removed to expose the film. When thus arranged, the lens slide or shutter is manipulated to make the proper exposure. After this is accomplished and the operation of photographing completed, the film shutter is replaced in the box, and the camera is ready for a repetition of the operation just described.

From the foregoing, it will be seen that I provide a roll film camera wherein it is not necessary to attempt to gage the distance of the camera from the object to be photographed, but this focusing is accomplished entirely on the screen, whereby, if it is desired, the ordinary finder can be entirely dispensed with.

It will be furthermore noted that when the focusing screen is brought into operative position for focusing, the said screen occupies identically the same plane or position which the film subsequently occupies during the photographing operation.

It will be still further noted that my invention provides means for so connecting the film holding section of the camera to the bellows section or box as to enable the film holding section to be swung to a position to permit of viewing the object to be photographed through the lens of the camera; and furthermore, the construction is such that provision is made for protecting the film from the injurious effects of light while the camera is in open position.

While I have described the invention as particularly adapted for a camera of the roll film type, yet I do not wish to be understood as specifically limiting myself to this particular type of camera, it being the intention to cover the improvements for use in connection with any form of camera to which they may be found applicable.

What I claim as my invention is:

1. A camera having a film carrying section and a lens section connected together and movable relatively to each other to displace the film from exposure position, a focusing curtain, and a roller on which said curtain is normally wound, said roller being bodily movable by the pull upon the curtain when being unwound, to position the curtain in the same position relative to the camera box as is occupied by the film during exposure.

2. A camera having a film carrying section and a lens section connected together and movable relatively to each other to displace the film from exposure position, a focusing curtain, and a roller on which said curtain is normally wound, said roller being spring retained normally out of the focusing plane when wound, and bodily movable to the focusing plane by the pull upon the curtain when being unwound to the same focusing position as is occupied by the film during exposure, said curtain being provided with an end cross-piece for retaining the curtain in the unwound position and constructed to coöperate with the curtain roller to space the curtain an equal distance from the face of the camera box.

3. A camera having a film carrying section and a lens section connected together and movable relatively to each other to displace the film from exposure position, a focusing curtain, and a roller on which said curtain is normally wound, said roller being spring retained normally out of the focusing plane when wound, and bodily movable to the focusing plane by the pull upon the curtain when being unwound to the same focusing position as is occupied by the film during exposure.

4. A camera having a film carrying section and a lens section connected together and movable relatively to each other to displace the film from exposure position, said lens section being provided with a rectangular recess in one face, and said film section having a rectangular tongue constructed to engage said rectangular recess to form a light proof joint between the sections when in a closed position, a focusing curtain, and a roller on which said curtain is normally wound, said roller being bodily movable by the pull upon the curtain when being unwound, and said curtain being provided with an end cross piece shaped to engage a portion of said rectangular recess for retaining the curtain in unwound position and coöperating with the curtain roller to space the curtain an equal distance from the face of the camera box.

5. A camera having a film carrying section and a lens section connected together and movable relatively to each other to displace the film from exposure position, a focusing curtain, a roller on which said curtain is normally wound, a pair of arms pivoted at one end and supporting said roller in their opposite ends, springs engaging said arms for normally pressing them backwardly, whereby said roller and the curtain wound thereon are normally retained out of the exposure plane, and are movable to the exposure plane by the pull upon the curtain when being unwound.

In testimony whereof, I affix my signature.

ALFRED Z. MYRUP.

Copies of this patent may be obtained for five cents each, by addressing the "Commissioner of Patents, Washington, D. C."